United States Patent
Stenzel

(10) Patent No.: US 8,596,947 B1
(45) Date of Patent: Dec. 3, 2013

(54) AIRPORT BAGGAGE ACCUMULATION RACK HAVING ROTATABLE SHELVES, AND METHOD FOR HANDLING BAGGAGE

(76) Inventor: Kent J. Stenzel, Larkspur, CO (US)

( * ) Notice: Subject to any disclaimer, the term of this patent is extended or adjusted under 35 U.S.C. 154(b) by 273 days.

(21) Appl. No.: 13/042,461

(22) Filed: Mar. 8, 2011

Related U.S. Application Data

(63) Continuation-in-part of application No. 12/009,345, filed on Jan. 22, 2008, now abandoned.

(51) Int. Cl.
*B65G 1/00* (2006.01)
(52) U.S. Cl.
USPC .................................................. 414/331.04
(58) Field of Classification Search
USPC .............. 414/331.04, 331.08, 331.11, 679; 701/5; 244/137.1
See application file for complete search history.

(56) References Cited

U.S. PATENT DOCUMENTS

| | | | |
|---|---|---|---|
| 3,066,817 A * | 12/1962 | Bradshaw et al. ............. | 414/505 |
| 4,216,927 A * | 8/1980 | Byrd ......................... | 244/118.1 |
| 5,593,269 A * | 1/1997 | Bernard, II .............. | 414/331.04 |
| 5,902,089 A * | 5/1999 | Sinn et al. ..................... | 414/398 |
| 6,390,757 B2 * | 5/2002 | Ganiere ........................ | 414/391 |
| 6,454,510 B1 * | 9/2002 | Sinn et al. ..................... | 414/393 |
| 6,814,214 B2 * | 11/2004 | Warlow et al. ................ | 198/300 |
| 6,854,815 B1 * | 2/2005 | Smith .......................... | 312/268 |
| 6,905,095 B1 * | 6/2005 | Gruzdeva et al. .......... | 244/137.1 |
| 7,469,782 B2 * | 12/2008 | Hutton ......................... | 198/812 |
| 7,588,407 B2 * | 9/2009 | Cook ............................ | 414/426 |
| 7,775,756 B2 * | 8/2010 | Koike et al. .............. | 414/331.11 |
| 7,819,363 B2 * | 10/2010 | Johnson et al. ............ | 244/137.1 |
| 2003/0049107 A1 * | 3/2003 | Thogersen .................... | 414/398 |
| 2003/0091415 A1 * | 5/2003 | Thogersen .................... | 414/398 |
| 2004/0079620 A1 * | 4/2004 | Aleshire ...................... | 198/711 |
| 2007/0119926 A1 * | 5/2007 | Sloan et al. .................. | 235/384 |
| 2007/0201971 A1 * | 8/2007 | Meijer .......................... | 414/679 |
| 2008/0056877 A1 * | 3/2008 | Huang ....................... | 414/796.7 |

* cited by examiner

*Primary Examiner* — Joshua Rudawitz
(74) *Attorney, Agent, or Firm* — G. F. Gallinger

(57) ABSTRACT

A rack for loading and accumulating bags comprises: a) a frame; b) a plurality of similarly sized shelves maintained in a horizontal position; c) said frame carrying similar shelves on an opposite side; d) tracks and a powered mechanism to rotate the shelves. After a first shelf positioned on a bottom portion of the first long side is loaded, it can be moved upwardly, generally concurrently rotating all of the shelves around the rack. All of the shelves can be thereby loaded from the portion position on a first long side. Lifting and carrying required to completely fill the rack is thereby minimized. Most preferably a shelf unloading mechanism is provided to push the shelf and/or bags loaded thereon off the rack; so that all of the shelves can be discharged therewith, by rotatably moving all of the shelves after each shelf has been unloaded.

14 Claims, 6 Drawing Sheets

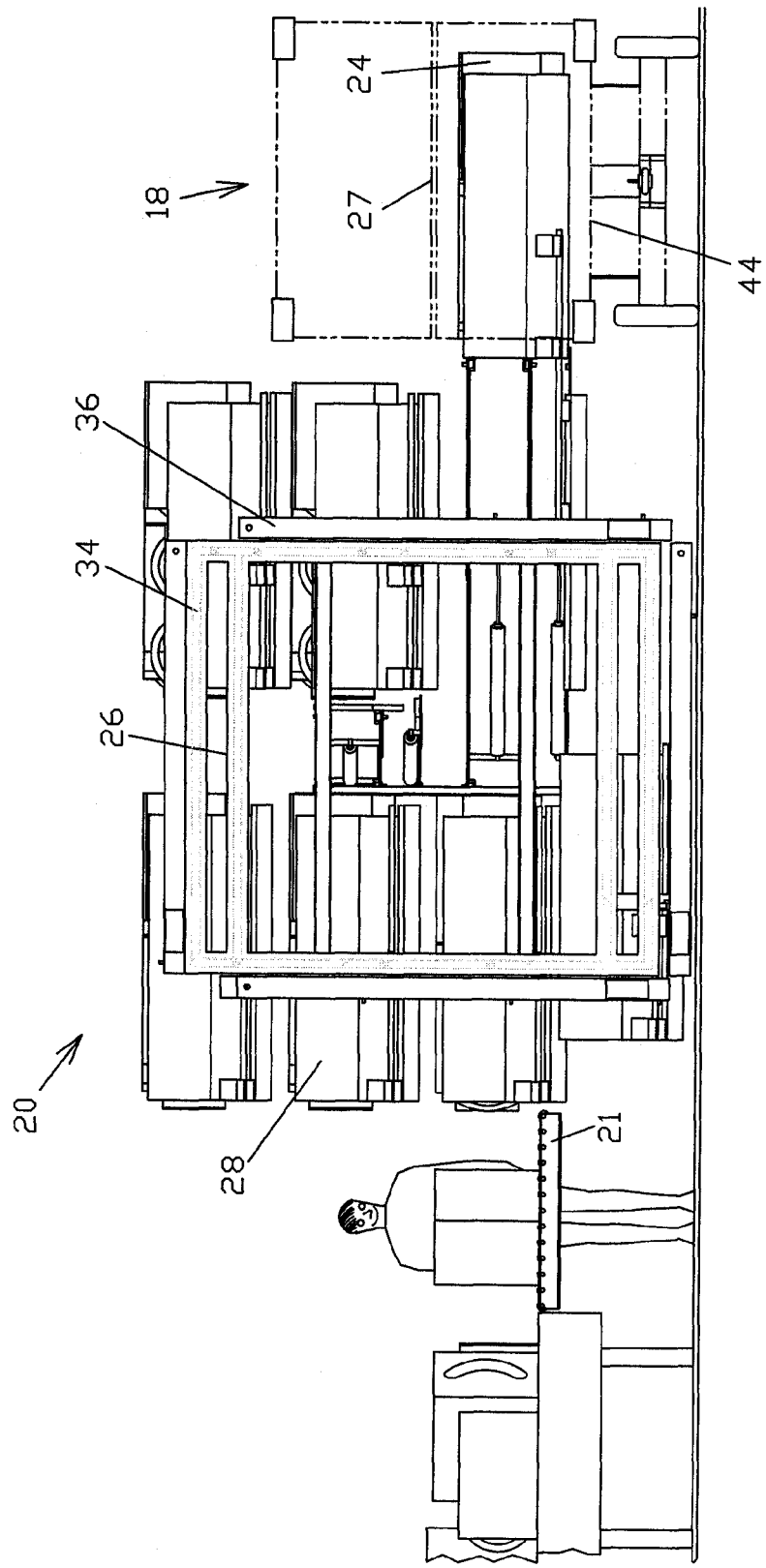

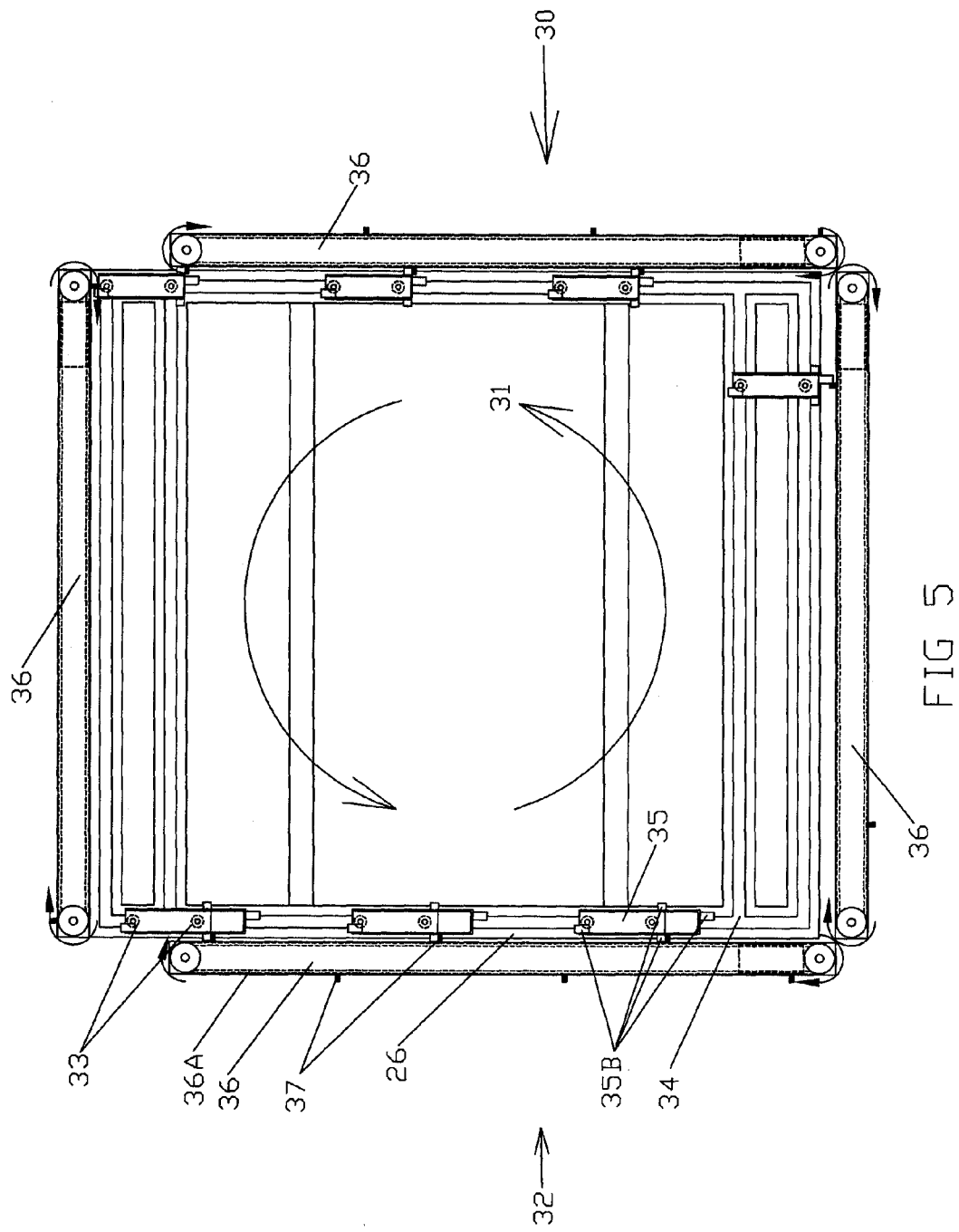

AIRPORT BAGGAGE ACCUMULATION RACK HAVING ROTATABLE SHELVES, AND METHOD FOR HANDLING BAGGAGE

PRIOR APPLICATION

This application is filed as a Continuation in Part of U.S. patent application Ser. No. 12/009,345, filed Jan. 22, 2008 now abandoned by Kent J. Stenzel, and claims the priority of it filing date.

FIELD OF THE INVENTION

This invention relates to more efficiently unloading ticketed baggage from a conveyor onto a baggage cart for delivery to waiting planes. More particularly this invention relates to an intermediate baggage accumulation and discharge rack which minimizes lifting and speeds loading onto the baggage cart.

BACKGROUND OF THE INVENTION

Ticketed bags are conveyed from a check-in area, to the departure area of an airport on conveyors. These conveyors typically dump onto a closed loop, discharge conveyor. Baggage handlers must then individually carry and lift each bag from the discharge conveyor onto a baggage cart. The handlers must carry and hand lift the bags to the baggage cart, and reach across a few feet to fill a lower row on a far side of the cart before lifting bags onto the lower row on the near side of the cart. Then they must similarly lift bags to an upper row and across the cart before then lifting bags to the upper row near side of the baggage cart. After the baggage cart has been loaded the baggage handlers most frequently must push the loaded cart out of the way and position an empty waiting cart before they can finish unloading the discharge conveyor. Empty carts may weigh 1800 pounds and loaded carts may weigh more than 5000 pounds. Loading, shuffling unloaded and loaded carts, co-ordinating transport, and subsequently unloading the baggage cart is a time consuming, labor intensive, injury prone process. The bags are both bulky and heavy. Loaders frequently suffer injuries and are off work due to these injuries.

Airports are very limited by space as to the number of baggage carts that can circulate, and be staged empty around the discharge conveyors. Baggage carts are typically 5 feet wide by 10 feet long. If there was sufficient room loaders and drivers would prefer to stage an adequate number of empty baggage carts parallel to the discharge conveyors to completely load all baggage onto for a given flight. Space limitations in the number of baggage carts that can be staged is presently a bottleneck for the airline industry which limits the throughput of baggage, and the throughput of planes.

Transporting, individually lifting and loading the bags onto the baggage cart, co-ordinating towing the baggage cart to the awaiting aircraft, then rehandling the bags to load onto the aircraft is a considerably more time consuming step, than having the passengers walk onto the aircraft. It is not unusual for the loaders to be held up while they wait for a driver, who tows the loaded carts to an awaiting aircraft, or to remove and replace the loaded cart with an empty cart. Passengers often wait for completion of baggage loading prior to departure. If a more efficient apparatus or method of moving the bags from the discharge conveyor to the aircraft could be devised, then the same passenger gates, at any given airport could turn around substantially more flights. What is needed is a baggage rack which eliminates the need for loaders to substantially lift the bags, and which can accommodate more bags. What is also needed is a baggage rack which eliminates the need to stage carts at the discharge conveyor, and thereby eliminates the need to shuffle empty and full carts to and from the discharge conveyor. Additionally if the loaded rack could be configured to automatically discharge accumulated bags, substantial additional labor and time could be saved.

OBJECTS OF THE INVENTION

It is an object of this invention to disclose a baggage rack having rotatable shelves which the baggage handlers could fully load without the need to substantially lift the bags. It is an object of this invention to disclose a baggage rack which substantially reduces baggage handler injury and lost working time. It is an object of this invention to disclose a baggage rack which can hold substantially more bags so that the need to shuffle both full and empty carts is eliminated. It is an object of this invention to disclose a baggage rack which because of its ability to hold substantially more bags minimizes baggage loading space requirements around individual areas in an airport. It is yet a further object of this invention to disclose a baggage rack which because of its ability to be more efficiently loaded, and to hold substantially more bags, substantially reduces baggage plane loading time. Traditionally, baggage loading is not only the most labor intensive, but also the most space and time consuming process in an airport. Accordingly, it is an object of this invention, by reducing a historical bottleneck in airports, to substantially improve airport efficiency.

One aspect of this invention provides for a rack for loading and accumulating bags thereon comprising: a) a frame having a length, a width, opposite ends, and opposite open faced long sides; b) a plurality of similarly sized shelves, each shelf carried by, and generally extending between the frame ends, and in vertical alignment with another shelf on a first open faced long side; c) said frame also carrying similar shelves on the opposite open faced long side; d) wherein said shelves are movably carried in tracks and a powered mechanism is provided which generally rotatably moves the shelves around the ends of the frame and, e) wherein the shelves are held and maintained in a horizontal working position so that a bag can be first rested on an a front shelf portion without the shelf tipping from its horizontal position prior to being pushed back fully onto the shelf. After a first shelf positioned on a bottom portion of the first long side is loaded, it can be moved upwardly, generally concurrently rotating an empty bottom shelf on the opposite side into the bottom position on the first open faced long side, and generally concurrently rotating a top shelf on the first long side into a top position on the second long faced side. All of the shelves can be thereby loaded from the bottom position on the first long side; rotatably moving all of the shelves after filling each shelf. Lifting and carrying required to completely fill the rack is minimized.

In a preferred aspect of this invention the rack further comprises a shelf discharge mechanism, configured to push the shelf and/or bags loaded thereon the opposite long side of the rack off the rack; so that all of the shelves can be discharged therewith, by rotatably moving all of the shelves after discharging the shelf on the opposite long side of the rack.

In yet another preferred embodiment of the invention each shelf on the rack is carried on a drawer slide so that when the discharge mechanism pushes the sliding shelf initially slides out of, and laterally away from the opposite long side, thereby facilitating subsequent drop placement directly beneath and in front of the extended shelf.

Various other objects, advantages and features of this invention will become apparent to those skilled in the art from the following description in conjunction with the accompanying drawings.

FIGURES OF THE INVENTION

FIG. 1 is a perspective view of a baggage rack having rotatable shelves.

FIGS. 2A, 2B, and 2C are perspective views of the rack unloading mechanism. FIG. 2A shows the rack unloading mechanism in a fully retracted position. FIG. 2B shows the rack unloading mechanism in a fully extended position. FIG. 2C shows the rack unloading mechanism in a fully extended position wherein the shelf is fully retracted. FIG. 2D is a plan view of the discharge mechanism in a fully retracted position, as shown in FIG. 2A. FIG. 2E is a plan view of the discharge mechanism in a fully extended position as shown in FIG. 2B.

FIG. 3 is an elevational view of the loaded baggage rack shown in FIG. 1 better showing discharge into a baggage cart.

FIG. 5 is a cross sectional view taken along lines 5-5 on FIG. 1 showing the powered mechanisms which independently move the shelves across each of the four sides of the rack.

Figure 1:
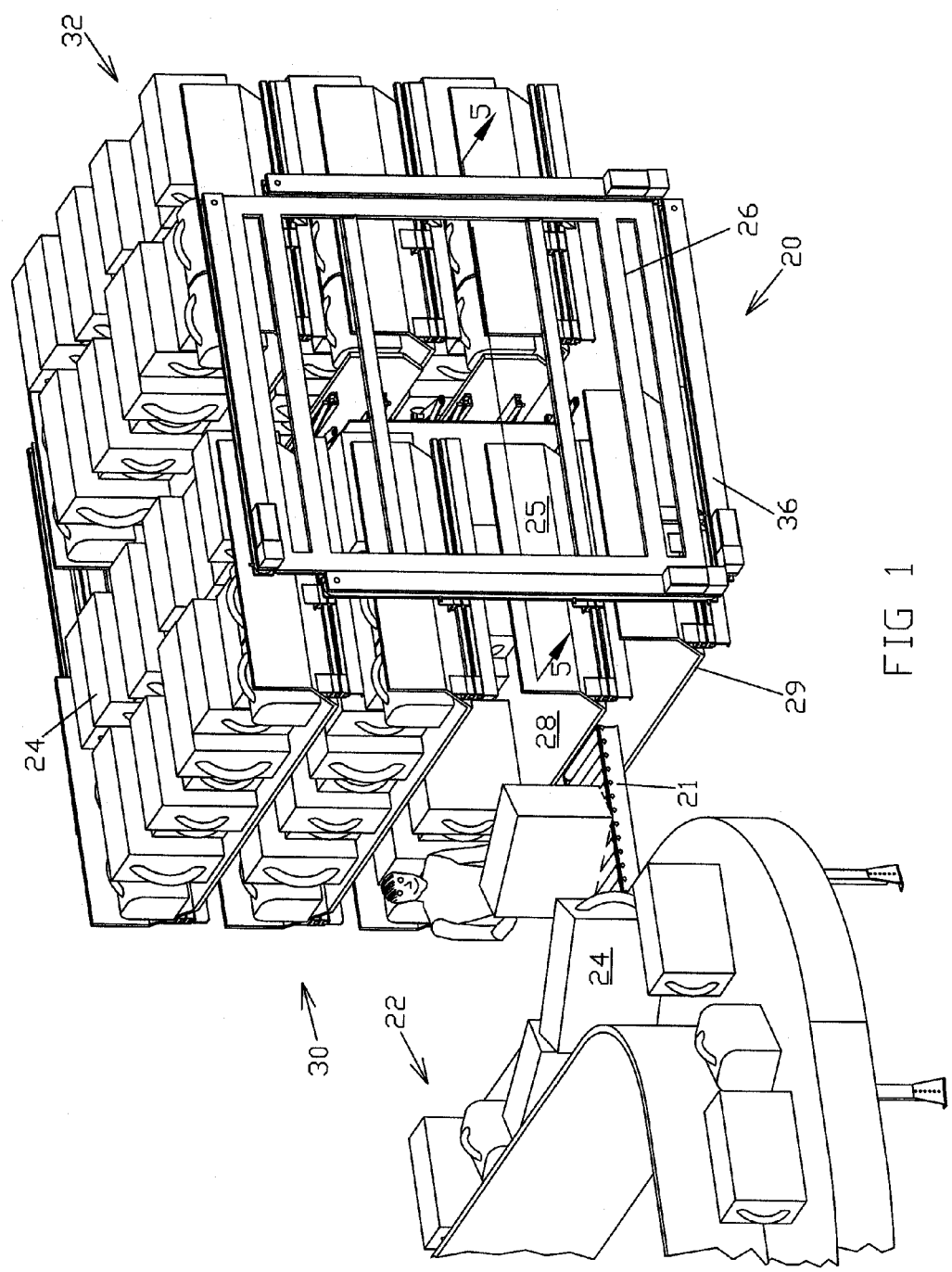

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a baggage rack 20 having rotatable shelves 28. Most generally a rack 20 for loading and accumulating bags 24 thereon comprising: a) a frame 26 having a length, a width, opposite ends, and opposite open faced long sides; b) a plurality of similarly sized shelves 28, each shelf 28 carried by, and generally extending between the frame 26 ends, and in vertical alignment with another shelf 28 on a first open faced long side 30; c) said frame 26 also carrying similar shelves 28 on the opposite open faced long side 32; d) wherein said shelves 28 are movably carried in tracks 34 and a powered mechanism 36 is provided which generally rotatably moves the shelves 28 around the ends of the frame 26. After a first shelf 29 positioned on a bottom portion of the first long side 30 is loaded, the shelf 29 can be moved upwardly, generally concurrently rotating an empty bottom shelf 28 on the opposite side 32 into the bottom position on the first open faced long side 30, and generally concurrently rotating a top shelf 28 on the first long side 30 into a top position on the second long faced side 32. All of the shelves 28 can be thereby loaded from the bottom position on the first long side 30; rotatably moving all of the shelves 28 after filling each shelf 28. It is particularly important to note that the shelf mechanism 36 ensures that e) the shelves 28 are held and maintained in a horizontal working position so that a bag 24 can be first rested on an a front shelf portion without the shelf 28 tipping from its horizontal position prior to the bag 24 being pushed back fully onto the shelf 28. Because the shelves 28 are always loaded onto the shelf 28 in the lowest position on the rack 20 lifting is minimized. Use of a transfer conveyor 21 between the bag discharge conveyor 22 and the rack 20 allows the bag 24 to be wholly slid, without any lifting at all, from the discharge conveyor 22 onto the rack 20. And because the bags are always initially loaded onto the closest side of the rack 20 carrying is minimized in contrast to the present conventional system of carrying the bags 24 to a mobile cart (not shown).

In a preferred aspect of the invention the shelves 28 further comprise end walls 25 to ensure bags 24 carried thereon are supported in an upright position.

Figure 2A:
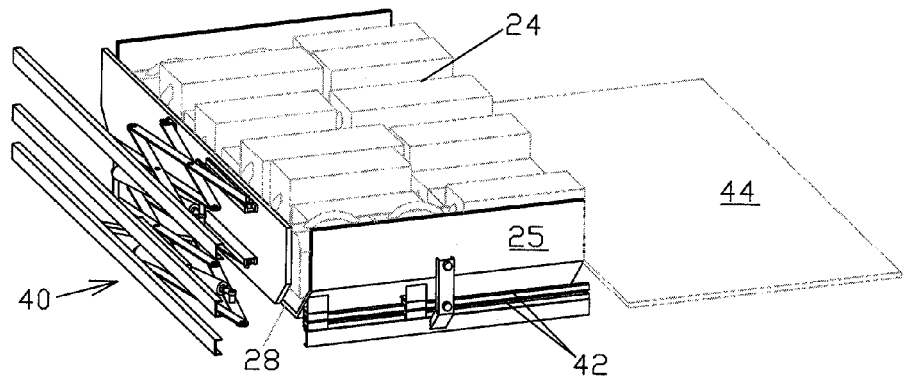
Figure 2B:
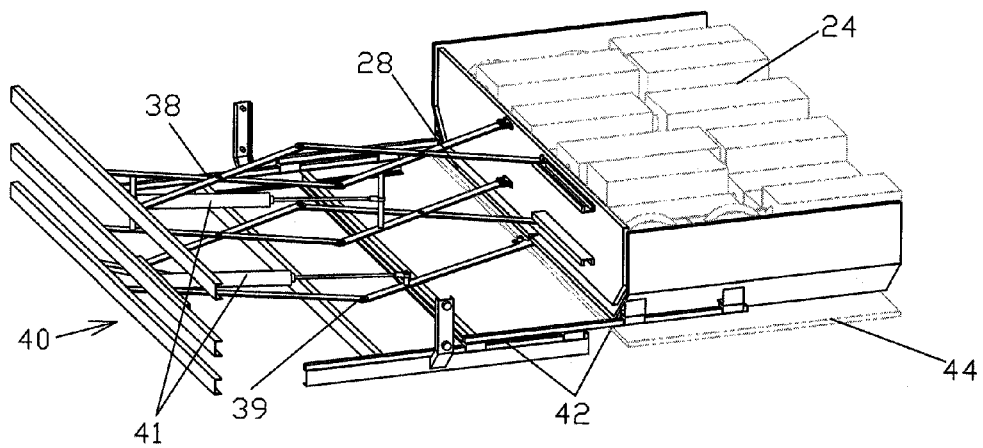
Figure 2C:
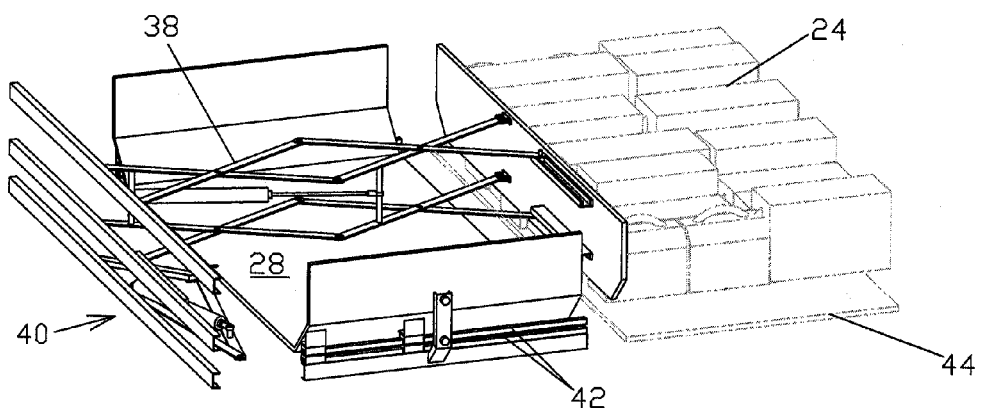

FIGS. 2A, 2B, and 2C are perspective views of the shelf unloading mechanism 40. FIG. 2A shows the shelf 28 and the shelf unloading mechanism 40 in a fully retracted position. FIG. 2B shows the shelf 28 and the shelf unloading mechanism 40 in a fully extended position. FIG. 2C shows the shelf unloading mechanism 40 in a fully extended position and the shelf 28 in a fully retracted position. The shelf unloading mechanism includes piston 41, scissors 38. The shelf unloading mechanism 40, centrally positioned within the rack 20, is configured to first push the shelf 28 loaded with bags 24 forwardly. Then while the shelf unloading mechanism 40 is maintained in a forward position, the shelf 28 is retracted, thereby dumping the bags 24 onto the target 44. Each shelf 28 when rotated to a position adjacent to the shelf loading mechanism 40 can be sequentially discharged therewith. Most preferably each shelf 28 is carried on a drawer slide 42 so that when the shelf unloading mechanism 40 pushes on the shelf 28 loaded with bags 24, the sliding shelf 28 initially slides out, thereby facilitating subsequent drop placement directly beneath and in front of the extended shelf 28.

Figure 2D:
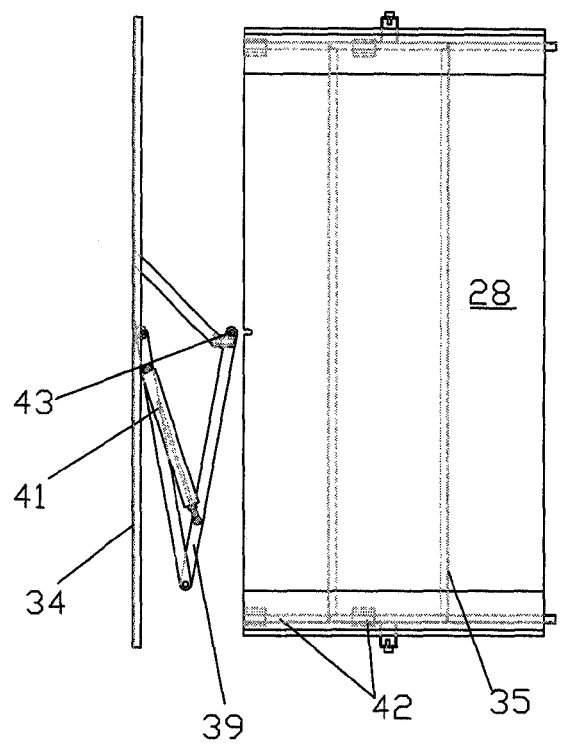
Figure 2E:
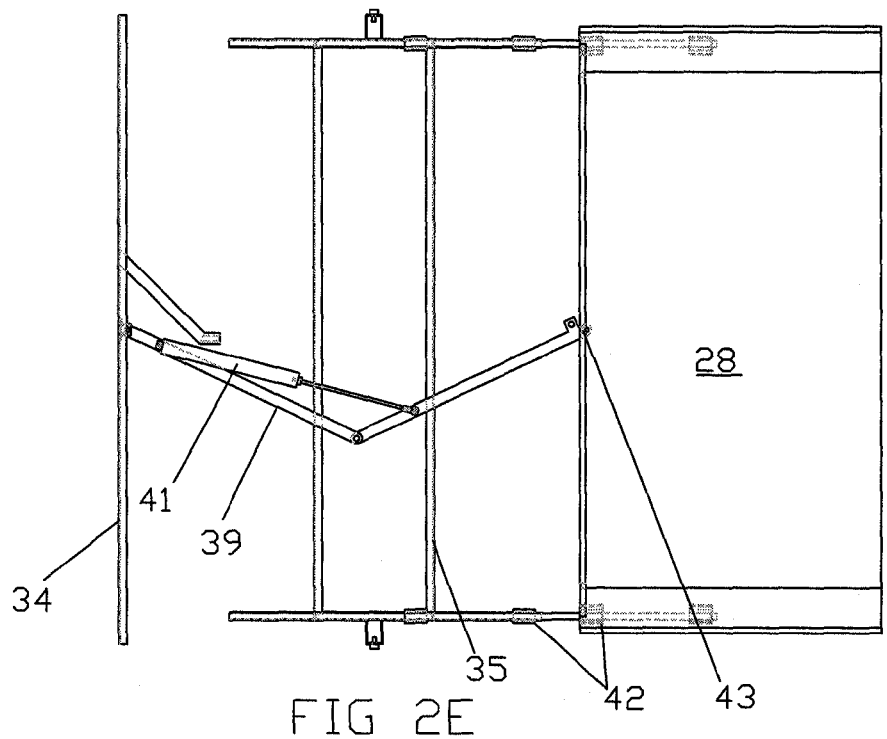

FIG. 2D is a plan view of the shelf extension/retraction mechanism 39 in a fully retracted position, as shown in FIG. 2A. The shelf retraction mechanism 39 includes scissor arms 39A, piston 41, and latch 43. FIGS. 2D and 2E best show a piston 41 which extends between scissor arms 39A, and a latch 43 which latches and unlatches the outer end portion of scissor arms 39A to the sliding shelf 28. In a preferred embodiment the latch 43 is magnetic. FIG. 2D additionally shows the scissor arms 39A unengaged from the shelf 28 to thereby allow rotation into and out of the unloading position. FIG. 2E is a plan view of the scissor arms 39A in a fully extended position as shown in FIG. 2B. FIG. 2E additionally shows the scissor arms 39A latched 43 to the shelf 28 so it can thereby extend and retract the shelf 28.

In the most preferred embodiment of the invention the shelf unloading mechanism 40 pushes on the loaded bags 24 and a shelf retraction mechanism 39 is included to retract the shelf 28 back into the frame 26 when the shelf unloading mechanism 40 is fully extended so that after the sliding shelf 28 is extended and positioned above a target drop area 44, then when the sliding shelf 28 is retracted the bags 24, maintained in position by the shelf unloading mechanism 40, gently drop beginning at, and from the most extended end of the sliding shelf 28 onto a target area 44 positioned directly beneath the sliding shelf 28.

FIG. 3 is an elevational view of the loaded baggage rack 20 shown in FIG. 1, better showing discharge into a baggage cart 18. A rack 20 for discharging the loaded rack onto a cart 18 having a length and shelf height spacing generally similar to the length and shelf height spacing of the rack 20, wherein the shelf unloading mechanism 40 discharges the bottom shelf 28 on the opposite side 32 of the rack 20, and further comprising a second shelf unloading mechanism 40, centrally positioned within the rack 20 above the bottom shelf unloading mechanism 40, configured to push bags 24 loaded on a shelf 28 immediately above the bottom shelf 28 on the opposite long side 32 of the rack 20 off the rack 20; so that the bottom two shelves 28 on the opposite long side 32 of the rack 20 can discharged into of the baggage cart 18.

As described above most preferably each shelf 28 is carried on a drawer slide 42 so that when the shelf unloading mechanism 40 pushes on the loaded bags 24 thereon, or loaded shelf 28, the sliding shelf 28 initially slides out of, and laterally away from the opposite long side 32, thereby facilitating subsequent drop placement directly beneath each of the extended shelves 28. Again, most preferably a shelf retraction mechanism 39 is included to retract the shelf 28 back into the frame 26 when the shelf unloading mechanism 40 is fully extended so that after the sliding shelf 28 is extended and positioned above a fixed shelf 27 in the baggage cart 18, then when the sliding shelf 28 is retracted the bags 24 maintained in an extended position by the shelf unloading mechanism 40, gently drop beginning at, and from the most extended end of the sliding shelf 28 onto the fixed shelf 27 of the baggage cart 18 positioned directly beneath the sliding shelf 28.

Figure 4:
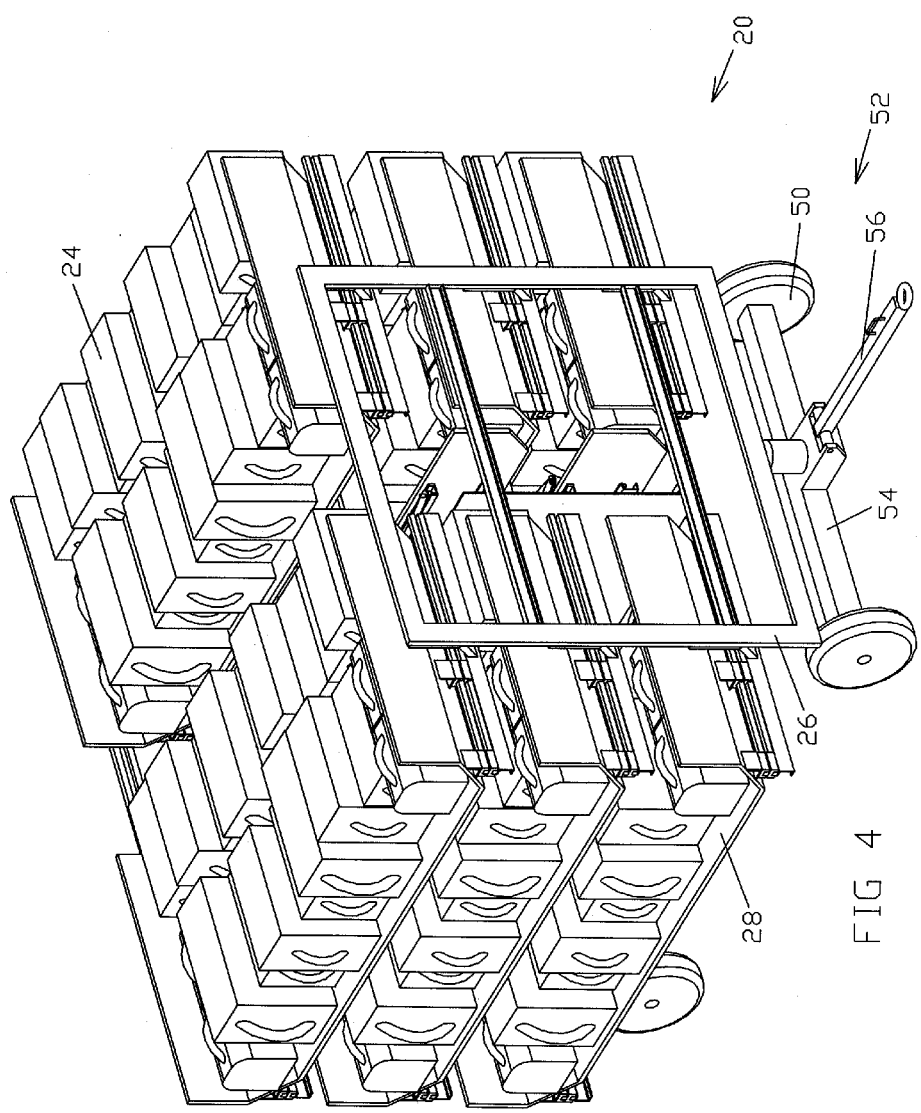
FIG. 4 is a perspective view of the baggage rack having wheels for transport when loaded to a plane.

FIG. 4 is a perspective view of the baggage rack having wheels for transport when loaded to a plane. If the rack 20 further comprises wheels 50, and a steering mechanism 52, which most preferably is a centrally pivoted front axle 54 and a tongue 56, then after the bags 24 are loaded onto the rack 20, the rack 20 can be towed, like a baggage cart 18 to, and then discharged onto a plane loading conveyor (not shown). Said loading plane conveyor (not shown) would be positioned just beneath the discharge shelf 28 on the opposite long side 32 of the rack 20 so that bags 24 would drop directly onto the plane loading conveyor (not shown).

FIG. 5 is a cross sectional view taken along lines 5-5 on FIG. 1 showing the powered mechanisms 36 that independently move the shelves 28 across each of the four sides of the rack 20. Guide wheels 33 are positioned within tracks 34. Powered mechanism 36 includes a drive chain 36A which carry dogs 37 extending outwardly therefrom. When the dogs 37 contact the shelf frames 35, shelves 28 on one side of the rack 20 are moved ahead one or more positions independently of shelves 28 on other sides of the rack 20 in the direction 31 around the rack 20. There are four independent power mechanisms 36, one for each open face 30,32 and one for each of the top and bottom side portions of the rack 20. Adjacent ends of the drive mechanisms 36 allow for a handoff at each corner of the rack 20 to transfer a shelf 28 from one side to the other. It should be noted that there are four dog tabs 35B on each shelf frame 35 to facilitate engagement with dogs 37 on the opposite open faces 30,32 of the rack 20.

Most generally a method of loading a baggage rack 20 comprises the steps of: i) providing a rack 20 for loading and accumulating bags 24 thereon as described most generally above; ii) positioning the first side of the rack 20 adjacent to the discharge conveyor 22; iii) minimally lifting and carrying, and loading bags 24 onto the bottom shelf 28 of the first side of the rack 20 until said shelf 28 is full; iv) rotating the shelves 28 on the rack 20 until the shelf 28 on the bottom portion is empty and again filling the newly rotated shelf 28 on the bottom portion with minimal lifting and carrying; and, v) repetitively rotating and loading adjacent shelves 28 of the rack 20 until all shelves 28 of the rack 20 are filled and/or bags 24 no longer remain on the discharge conveyor 22.

If the method further comprises the step of using a transfer conveyor 21 to move the bags 24 from the discharge conveyor 22 to the baggage rack 20, then the necessity of lifting and carrying the bags 24 is reduced. When the baggage rack 20 further comprises a shelf unloading system 40 centrally positioned within the rack 20, configured to push bags 24 loaded on a discharge shelf 28 on the opposite long side of the rack 20 off the rack 20; so that all of the shelves 28 can be discharged therewith, rotatably moving all of the shelves 28 after discharging the lower shelf 28 on the opposite long side of the rack 20; the method then further comprises the steps of pushing the bags 24 loaded on a bottom shelf 28 on the opposite long side of the rack 20 off the rack 20; and then rotating the shelves 28 and again pushing the bags 24 loaded on the opposite long side of the rack 20 off the rack 20 until all of the shelves 28 are discharged. The most general method can be further detailed with the rack 20 specifications detailed above.

While the invention has been described with preferred specific embodiments thereof, it will be understood that this description is intended to illustrate and not to limit the scope of the invention, which is defined by the following claims.

I claim:

1. A rack for loading and accumulating bags thereon comprises:
   a) a frame having a length, a width, opposite ends, and opposite open faced long sides;
   b) a plurality of similarly sized shelves, each shelf carried by, and generally extending between the frame ends, and in vertical alignment with another shelf on a first open faced long side;
   c) said frame also carrying similar shelves on the opposite open faced long side;
   d) wherein said shelves are movably carried in tracks and a powered mechanism is provided which generally rotatably moves the shelves around the ends of the frame, so that after a first shelf positioned on a bottom portion of the first long side is loaded, it can be moved upwardly, generally rotating an empty bottom shelf on the opposite side into the bottom portion position on the first open faced long side, and generally rotating a top shelf on the first long side into a top position on the second long faced side, so that all of the shelves can be loaded from the bottom portion position on the first long side; rotatably moving the shelves after filling each shelf; and,
   e) wherein the shelves are held and maintained in a horizontal working position so that a bag can be first rested on a front shelf portion without the shelf tipping from its horizontal position prior to being pushed back fully onto the shelf;
   f) further comprising a shelf unloading mechanism centrally positioned within the rack, configured to push the shelf loaded with bags to the opposite long side of the rack off the rack; so that all of the shelves can be discharged therewith, by rotatably moving all of the shelves after discharging the shelf on the opposite long side of the rack;
   g) wherein each shelf is carried on a drawer slide so that when the shelf unloading mechanism pushes on the shelf loaded with bags, the sliding shelf initially slides out of, and laterally away from the opposite long side, thereby facilitating subsequent drop placement directly beneath and in front of the extended shelf.

2. A rack as in claim 1 wherein the shelves further comprise end walls to ensure bags carried thereon are supported in an upright position.

3. A rack as in claim 1 wherein the shelf unloading discharge mechanism pushes on the loaded bags and further comprising a shelf retraction mechanism to retract the shelf back into the frame when the discharge mechanism is fully extended so that after the sliding shelf is extended and positioned above a target drop area, then when the sliding shelf is retracted the bags maintained in position by the discharge mechanism, gently drop beginning at, and from the most extended end of the sliding shelf onto a target area positioned directly beneath the sliding shelf.

4. A rack as in claim 3 further comprising a wheeled rear axle and a pivoted wheeled front axle having a tongue, so that the bags on the loaded cart can be towed to, then loaded on an awaiting plane.

5. A rack as in claim 1 for discharging the loaded rack onto a baggage cart having a length and shelf height spacing generally similar to the length and shelf height spacing of the rack, wherein the shelf unloading mechanism discharges the bottom shelf on the opposite side of the rack, and further comprising a second shelf unloading mechanism, centrally positioned within the rack above the bottom shelf unloading mechanism, configured to push bags loaded on a shelf immediately above the bottom shelf on the opposite long side of the rack off the rack; so that the bottom two shelves on the opposite long side of the rack can discharge into the baggage cart.

6. A rack as in claim 5 wherein each shelf is carried on a drawer slide so that when the shelf unloading mechanism pushes the shelf loaded with bags, the sliding shelf initially slides out of, and laterally away from the opposite long side, thereby facilitating subsequent drop placement directly beneath each of the extended shelves.

7. A rack as in claim 6 further comprising a shelf retraction mechanism to retract the shelf back into the frame when the shelf unloading mechanism is fully extended so that after the sliding shelf is extended and positioned above a fixed shelf in the baggage cart, then when the sliding shelf is retracted the bags maintained in position by the shelf unloading mechanism, gently drop beginning at, and from the most extended end of the sliding shelf onto the fixed shelf of the baggage cart positioned directly beneath the sliding shelf.

8. A rack as in claim 1 further comprising a wheeled rear axle and a pivoted wheeled front axle having a tongue, so that the bags on the loaded cart can be towed to, and then loaded on an awaiting plane.

9. A method of loading a baggage rack comprising the steps of:
   i) providing a rack for loading and accumulating bags thereon as described in claim 1;
   ii) positioning the first side of the rack adjacent to a discharge conveyor;
   iii) loading bags on the bottom shelf of the first side of the rack until said shelf is full;
   iv) rotating the shelves on the rack until the shelf on the bottom portion is empty and after rotating, again filling the shelf on the bottom and,
   v) repetitively rotating and loading adjacent shelves of the rack until all shelves of the rack are filled and/or bags no longer remain on the closed loop discharge conveyor.

10. A method as in claim 9 further comprising the step of using a transfer conveyor to move the bags from the discharge conveyor to the baggage rack.

11. A method as in claim 10 wherein the baggage rack further comprises a shelf retraction mechanism to retract the shelf back into the frame when the discharge mechanism is fully extended so that after the sliding shelf is extended and positioned above a target drop area, then when the sliding shelf is retracted the bags maintained in position by the shelf unloading mechanism, gently drop beginning at, and from the most extended end of the sliding shelf onto a target area positioned directly beneath the sliding shelf.

12. A method as in claim 11 wherein the baggage rack further comprises wheels and a steering mechanism, being a pivoted front axle having a tongue; and further comprising the step of towing the loaded rack to a plane loading conveyor and discharging the bags thereon, said conveyor positioned marginally lower than the sliding shelf.

13. A method as in claim 10 wherein the baggage rack has wheels and further comprising the step of towing the loaded rack to a plane loading conveyor and discharging the bags thereon, said conveyor positioned marginally lower than the sliding shelf.

14. A method as in claim 10 wherein the baggage rack further comprises wheels and a steering mechanism; and further comprising the step of towing the loaded rack to a plane loading conveyor and discharging the bags thereon, said conveyor positioned marginally lower than the sliding shelf.

* * * * *